(12) United States Patent
Denis

(10) Patent No.: US 7,983,878 B1
(45) Date of Patent: Jul. 19, 2011

(54) TWO-STAGE DYNAMIC TRACK GROUPING

(75) Inventor: Nikolaos A. Denis, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1388 days.

(21) Appl. No.: 11/496,367

(22) Filed: Jul. 31, 2006

(51) Int. Cl.
*G06F 17/40* (2006.01)
(52) U.S. Cl. .................................... 702/188
(58) Field of Classification Search .............. 702/188
See application file for complete search history.

(56) References Cited

U.S. PATENT DOCUMENTS

| | | | | |
|---|---|---|---|---|
| 6,901,030 B1* | 5/2005 | Owen et al. | ............ | 367/124 |
| 2004/0068415 A1* | 4/2004 | Solomon | ............ | 705/1 |

OTHER PUBLICATIONS

Mike Hinman, "Some Computational Approaches for Situation Assessment and Impact Assessment", Proceedings of the fifth International Conference on Information Fusion, 2002.
A. Steinberg, C. Bowman and F. White, "Revisions to the JDL Data Fusion Model". Joint NATO/IRIS Conference, Quebec, Canada, 1998.
Peter J. Shea, Kathleen Alexander, John Peterson, "Group Tracking using Genetic Algorithms", Proceedings of the Sixth International Conference on Information Fusion, 2003.
John Cantwell, J. Schubert, and J. Walter, "Conflict-based Force Aggregation", Proceedings of the Sixth International Command and Control Research and Technology Symposium, Annapolis, USA, Jun. 19-21, 2001.
A. K. Jain, M.N. Murty, and P.J. Flynn, "Data Clustering: A Review," ACM Computing Surveys, vol. 31, No. 3, pp. 264-323, Sep. 1999.
Judea Pearl, "Heuristics: Intelligent Search Strategies for Computer Problem Solving". Addison-Wesley, 1984, pp. 36-42.
Dimitri P. Bertsekas and David A. Castanon, "A forward/reverse auction algorithm for asymmetric assignment problems", Jan. 1993, LIDS-P-2159.
Dimitri P. Bertsekas, "Network Optimization: Continuous and Discrete Models", Athena Scientific, 1998.

* cited by examiner

*Primary Examiner* — Aditya Bhat
(74) *Attorney, Agent, or Firm* — Duane Morris LLP

(57) ABSTRACT

Tracks of sensed targets are associated into groups and updated over time while tending to maintain their relationships. A two-pass clustering or grouping method includes a first pass groups targets into convoy or swarm groups. In the second pass, groups of targets converging at a common time at high-value-asset(s) are identified as coacting. The association of targets with groups over time is formulated as a constraint optimization problem and solved using a forward-reverse auction to tend to reduce the number of extraneous groups. In one version, countermeasures may be taken against the coacting groups.

18 Claims, 11 Drawing Sheets

STEP 1: INITIALIZE

- COMPUTE THE TRACK SIMILARITY MATRIX
- SET CURRENT_CLUSTER EQUAL A RANDOMLY SELECTED "LIVE" TRACK
- PLACE ALL REMAINING "LIVE" TRACKS INTO UNGROUPED_TRACKS_LIST

STEP 2: FORM CLUSTERS

WHILE UNGROUPED_TRACKS_LIST IS NOT EMPTY

- FIND TRACK FROM UNGROUPED_TRACKS_LIST CLOSEST (MOST SIMILAR) TO CURRENT_CLUSTER
- SET CLOSEST_TRACK TO CLOSEST TRACK AND REMOVE FROM UNGROUPED_TRACKS_LIST

IF SIMILARITY (CURRENT_CLUSTER, CLOSEST_TRACK) > THRESHOLD
    CURRENT_CLUSTER.ADD (CLOSEST_TRACK)      // ADD CLOSEST_TRACK TO CURRENT_CLUSTER

ELSE
    CLUSTERS.ADD (CURRENT_CLUSTER)      // ADD CURRENT_CLUSTER TO CLUSTERS
    NEW CURRENT_GROUP (CLOSEST-TRACK)      // SET CURRENT_GROUP TO CLOSEST_TRACK

FIG. 4b

Step 1: Initialize
- Compute the cluster Intercept matrices, $I^k = \left[\tau_{ij}^k\right]_{p \times m}$, $k=1,2$
- Place all CLUSTERS, $C_i$ into Ungrouped_Clusters_List

Step 2: Form GROUPS

WHILE Ungrouped_Clusters_List is not empty
  - Find indices $i^*, j^*$ such that $\tau_{i^*j^*}^1 = \min I^1$ // Find the minimum value in $I^1$
  IF $0 < \tau_{i^*j^*}^1 < \infty$ // Cluster $i^*$ is either in or is projected to enter $P_{j^*}^1$
    Current_Group = $C_{i^*}$
    Remove $C_{i^*}$ from Ungrouped_Clusters_List
    Set $I_{i^*j}^k = \tau_{i^*j}^k = \infty$ for $k=1,2$, and $j=1,\ldots,m$ // If Cluster $i^*$ is outside $P_{j^*}^1$, find all other clusters that are expected to enter
    //the outer defense perimeter of HVA $j^*$ approximately the same time
    IF $\tau_{i^*j^*}^1 > 0$
      Find all $\tilde{i}$ such that $\tau_{\tilde{i}j^*}^1 - \tau_{i^*j^*}^1 <$ Threshold$^1$ and $\tau_{\tilde{i}j^*}^1 = \min_j(I_{\tilde{i}j}^1)$
      FOR all $\tilde{i}$
        Current_Group.add($C_{\tilde{i}}$)
        Remove $C_{\tilde{i}}$ from Ungrouped_Clusters_List
        Set $I_{\tilde{i}j}^k = \tau_{\tilde{i}j}^k = \infty$ for $k=1,2$, and $j=1,\ldots,m$ // If Cluster $i^*$ is inside $P_{j^*}^1$, find all other clusters that are expected to enter
    //the inner defense perimeter of HVA $j^*$ approximately the same time
    as cluster $i^*$ IF $\tau_{i^*j^*}^1 = 0$
      Find all $\tilde{i}$ such that $\tau_{\tilde{i}j^*}^2 - \tau_{i^*j^*}^2 <$ Threshold$^2$ and $\tau_{\tilde{i}j^*}^2 = \min_j(I_{\tilde{i}j}^2)$
      FOR all $\tilde{i}$
        Current_Group.add($C_{\tilde{i}}$)
        Remove $C_{\tilde{i}}$ from Ungrouped_Clusters_List
        Set $I_{\tilde{i}j}^k = \tau_{\tilde{i}j}^k = \infty$ for $k=1,2$, and $j=1,\ldots,m$ // Add the Current_Group to the list of GROUPS
    GROUPS.add(Current_Group)

ELSE // the minimum projected time is $\infty$
    GROUPS.add(Ungrouped_Clusters_List)
    Remove all clusters from Ungrouped_Clusters_List

FIG. 7b

TWO-STAGE DYNAMIC TRACK GROUPING

FIELD OF THE INVENTION

This invention relates to target tracking by means of sensors and signal processing, and more particularly to identification of targets which coact against identified assets so that countermeasures can be applied.

BACKGROUND OF THE INVENTION

Multiple sensor systems are currently available that provide the ability to simultaneously view hundreds of square miles of surveillance area containing up to thousands of fixed and moving vehicles and assets. The raw sensor returns contain, or can be processed to generate, kinematic estimates (e.g. position, velocity, and bearing) and/or emission profile information. Various automated level-one fusion engines, trackers, have been developed that incrementally assemble the individual sensor reports into tracks, or sequences of radar (or other) reports associated with a single vehicle over time. These trackers provide periodic updates over the kinematic estimates of each battlefield object actively being tracked. Due to these advances in tracking technology the research community now understands well how to extract relevant data about individual physical objects, as described, for example, in Mike Hinman, "Some Computational Approaches for Situation Assessment and Impact Assessment", Proceedings of the fifth International Conference on Information Fusion, 2002. However, rarely does an individual object work in isolation in the battlefield. Usually groups of objects cooperate to perform a task and achieve a desired goal. Thus, when a higher level understanding of the battlespace is desired (level 2 and 3 fusion tasks as defined by the JDL fusion model (A. Steinberg, C. Bowman, and F. White, "Revisions to the JDL Data Fusion Model". Joint NATO/IRIS Conference, Quebec, Canada, 1998), the emphasis must shift from the individual object to groups of objects engaged in a common activity. Only when coordinated movements are perceived can the structure, behavior, or intent of an adversary be understood and addressed.

Current target trackers are designed to provide periodic updates of the kinematic state of all the tracks currently being maintained ("live" tracks). The track update rate depends on several factors including the sensor scan rate, the number of live tracks, the available computational resources, etc. The problem of detecting or determining the existence of coordinated action on the part of some of the targets can be defined as the attempt to organize all updated "live" tracks into mutually exclusive track groups and to define their relationships with previously defined groups. At least two factors make this a difficult problem. First, each time a tracker provides "live" track updates there may be, and in general are, a large number of valid track groupings. In particular, for N "live" tracks, the number of different possible groupings of the tracks is $2^N-1$ (Peter J. Shea, Kathleen Alexander, John Peterson, "Group Tracking using Genetic Algorithms", Proceedings of the Sixth International Conference on Information Fusion, 2003). Second, each time a new set of mutually exclusive groups is computed, they have to be associated with groupings defined in the previous time instance while maximizing group continuity; in general an NP-hard problem (generally referring to classes of problems that are difficult to solve). More specifically, "The complexity class of decision problems that are intrinsically harder than those that can be solved by a nondeterministic Turin machine in polynomial time; when a decision version of a combinatorial problem is proved to belong to the class of NP-complete problems, then the optimization version is NP-hard."

Improved andor alternative coordinated-action computer processing apparatus and methods are desired.

SUMMARY OF THE INVENTION

A method according to an aspect of the invention is for establishing or determining the presence of coordination among targets tracked by at least one sensor system. The method comprises the step of generating tracks representing an estimate of the location, current speed, and current direction of targets within a region of interest. The current speed and current location of the targets can be determined by calculation from the sensed position, if desired. The method includes the further steps of iteratively performing computer-aided steps (a), (b), (c), and (d). Step (a) includes the assigning to each of a plurality of tracks a pattern characteristic of one of convoy group and swarm group. Step (b) includes the determination of the estimated location of prior-defined assets, which can be stationary or moving assets, and which may be determined by current sensing or by reference to known locations stored in memory. These prior-defined assets will generally be friendly assets, as the coordination of friendly targets will ordinarily be known a priori and will not need to be determined by processing. Step (c) includes determining if the projection of the current movement of two or more of the groups simultaneously intersect at the estimated location of any one of the defined assets, to thereby define an intercept group. Intercepting groups may be all-convoy, all-swarm, or mixed convoy and swarm. Step (d) involves associating together groups identified during the current iteration with corresponding clusters identified during prior iterations, which promotes group continuity as a function of time. In one potential mode, the method includes the step of taking action against those groups identified as acting together or in consort.

A method according to an aspect of the invention is for establishing the existence of coordination among targets tracked by at least one sensor system. The method comprises the step of generating tracks representing an estimate of the location, current speed, and current direction of targets within a region of interest. The speed and direction may be derived from sensor information relating to the position of the targets from time to time. The method includes the step of iteratively performing a number of steps, including (a) assigning to each of a plurality of tracks a pattern characteristic of one of convoy group and swarm group (that is, either convoy or swarm group), and (b) determining the estimated location of one or more defined assets, which step (b) may include substeps of determining the estimated location of a high-value asset and determining the location of at least one perimeter about the location. The third step (c) of the iteration is the determination if the projection of the current movement of two or more of the convoy groups or swarm groups simultaneously intersect at the estimated location of any one of the defined assets, to thereby define an intercept group. The term "simultaneously" depends upon the context, but implies some identified time interval which is relevant in context. The iterative process also includes the step (d) of associating together groups identified during the current iteration with corresponding groups identified during prior iterations, which promotes group continuity as a function of time. The associating step may include the use of a forward/reverse auction algorithm. The step of assigning to each track a pattern characteristic of one of convoy group and swarm group may include the step of favoring prior-established groupings. In a battlespace or military context, an additional step may include the step of taking action against at least elements of the identified target groups acting together.

In a preferred mode of the method, the step of assigning to each of a plurality of tracks a pattern characteristic of one of convoy group and swarm group includes the steps of (a) computing track similarity matrices for all pairs of tracks, and (b) selecting a base track from a list of tracks. This mode further includes the step of selecting from among the list of tracks that remaining track which is most similar to the base track, and removing the remaining track from the list of all tracks, and repeating the steps of selecting a first track and selecting from among the list of tracks, until the list of tracks is empty.

According to an aspect of the invention, the step of assigning to each of a plurality of tracks a pattern characteristic of one of convoy group and swarm group may include the steps of (a) placing all tracks into a list of ungrouped tracks and (b) computing track similarity matrices for all pairs of tracks in the list of ungrouped tracks. In this aspect, a base track is selected from the list of ungrouped tracks, and deemed it to be a member of a first group. The base track is removed from the list of ungrouped tracks. From the list of ungrouped tracks, that track which is most similar to the base track is selected, to thereby identify a most similar track. The most similar track is removed from the list of ungrouped tracks. The similarity between the base track and the most similar track is compared with a threshold, to thereby identify that threshold-exceeding most similar track as being one in which the similarity exceeds a threshold and that non-threshold-exceeding most similar track as being one in which the similarity does not exceed the threshold. The threshold-exceeding most similar track is added to the first group and the non-threshold-exceeding most similar track is identified as a new group.

In an advantageous mode of the method, the step of determining if the projection of the current movement of two or more of the convoy groups or swarm groups simultaneously intersect at the estimated location of any one of the defined assets may comprise the steps of identifying that one of the convoy group and swarm group projected to first enter a perimeter about one of the assets, and determining if the one of the convoy group and swarm group projected to first enter a perimeter is within or without the perimeter. If the first group is without the perimeter, an identification is made of those of the convoy groups and swarm groups which are projected to enter the perimeter within a threshold time of the one of the convoy group and swarm group projected to first enter a perimeter. Such convoy groups and swarm groups are deemed to be intercepting groups. If the first group is within the perimeter, an identification is made of those of the convoy groups and swarm groups which are projected to enter a second perimeter, smaller than the first perimeter, about the asset within a second threshold time, and deeming such convoy groups and swarm groups to be intercepting groups. The second threshold time may be the same as the first threshold time.

DESCRIPTION OF THE INVENTION

The invention addresses the track grouping problem, defined as the ability to associate multiple tracks into a common group and maintain their relationship over time. An instance of this problem occurs in the battlefield when an armored column of tanks and support vehicles are moving together as a unit (a column). Another instance of this problem occurs when a collection of small enemy boats performs a coordinated attack against a friendly ship.

An aspect of the invention uses an approach in which, at each periodic tracker update, a) the individual track updates are organized into a set of mutually exclusive clusters based on their estimated kinematic states and their relationships to previously defined clusters (groups), and b) the current clusters are associated with the clusters identified in the previous time update. A two pass clustering algorithm is used to organize tracks into mutually exclusive groups. The first pass clusters vehicles that are closely located and/or traveling in similar fashions. The second pass clusters vehicles converging to a common point and time in the battlespace. The problem of associating groups between successive track update time intervals is formulated as a constraint optimization problem and is solved using a forward-reverse auction algorithm.

Figure 1:
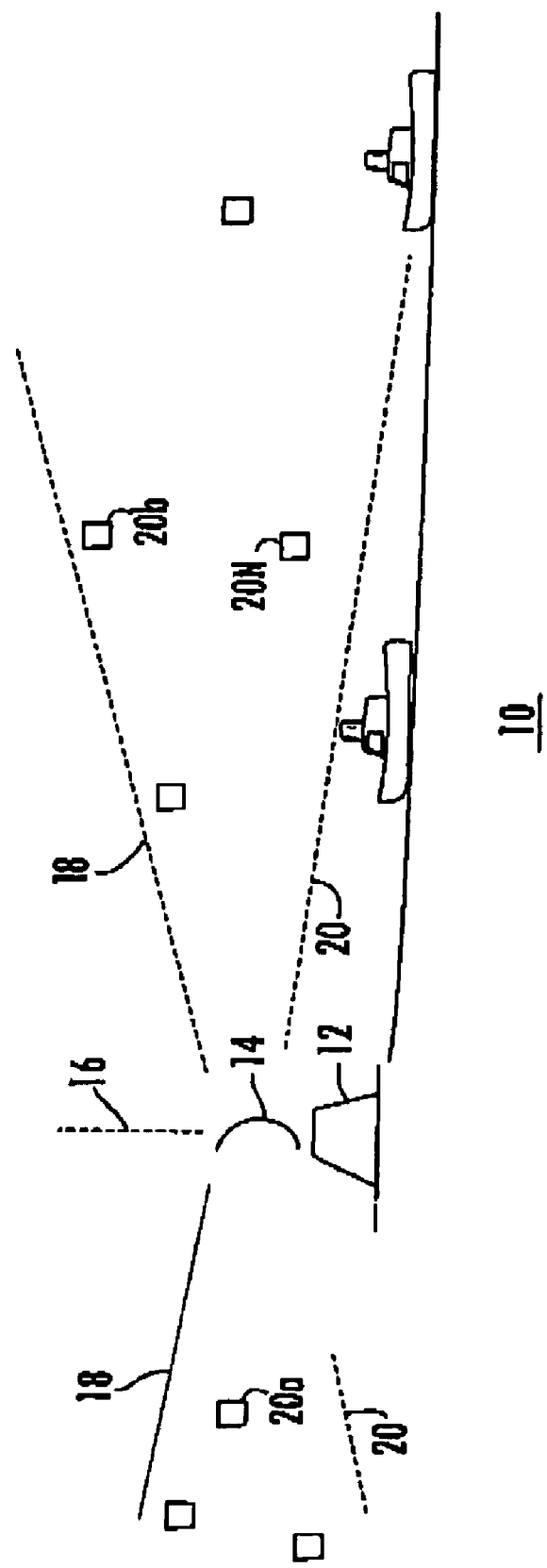
FIG. 1 is a simplified illustration of a sensor in the form of a radar system scanning a battlespace containing a plurality of targets.

FIG. 1 illustrates a battlespace 10 in which a sensor 12, which may be a ground-based radar system includes an antenna 14 which rotates about a vertical axis 16 to scan a toroidal or annular volume centered about the vertical axis. The limits of the scan volume are suggested by dash upper and lower scan limit lines 18 and 20, respectively. Within the scanned volume, various targets are indicated by blocks designated 20a, 20b, . . . , 20N. The targets may be stationary or in motion. The battlespace 10 includes assets in the form of friendly ships designated 22a and 22b. Ships 22a and 22b may be stationary or in motion. Friendly assets may also include land-based assets, which may also be at fixed locations or in motion. Radar system 12 is presumably at a fixed location.

Figure 2A:
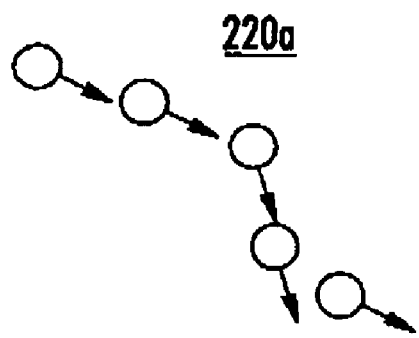
FIG. 2a represents sensed tracks which may be indicative of a convoy group or cluster.

A group is defined as a collection of objects or targets that are moving in accordance to a pattern. Three movement patterns are considered in the description of an aspect of the invention, but the approach could be generalized to include others. The movement patterns are: (a) convoy, (b) swarm, and (c) intercept. FIG. 2a illustrates a plan-position-indicator (PPI) representation of a plurality of targets 220a in a region, together with arrows indicating their current directions and approximate speed. The convoy pattern or group of FIG. 2a represents object movements analogous to the ones exhibited by military convoys. In this formation, vehicles travel closely in a single file, while attempting to maintain a constant inter-vehicle separation. The speeds of the elements of a convoy tend to be the same. The direction/speed arrows of FIG. 2a suggest that each target directs itself approximately toward the location of the preceding target in the convoy.

Figure 2B:
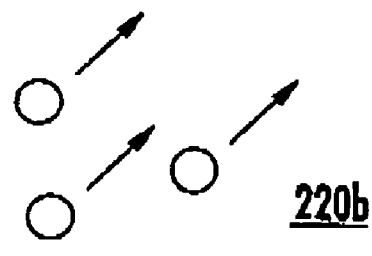
FIG. 2b represents sensed tracks which may be indicative of a swarm group.

The swarm pattern models objects that are moving towards the same direction with similar velocities, without however maintaining any spatio-temporal constraints. FIG. 2b illustrates a swarm pattern or group of targets 220b, which their motion arrows indicate are traveling in approximately parallel directions with roughly the same velocities.

Figure 2C:
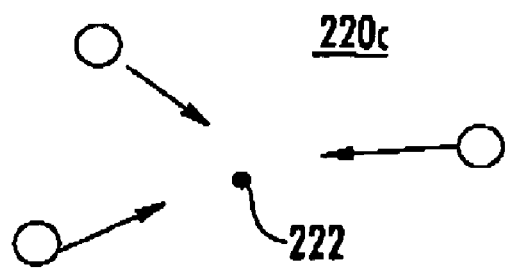
FIG. 2c represents sensed tracks which may be indicative of an intercept group.

The intercept pattern or group models objects that are traveling on different paths, but which are projected to converge at approximately the same point and time. In FIG. 2c, the targets 220c are all traveling toward a location 322 with approximately the same speed. Since the distance of each of the targets 220c from location 222 is about the same, it can be inferred that they will arrive at that location at about the same time.

Most group-tracking research has focused on identifying convoy patterns, which are very common in land warfare, as indicated in John Cantwell, J. Schubert, and J. Walter, "Conflict-based Force Aggregation", Proceedings of the Sixth International Command and Control Research and Technology Symposium, Annapolis, USA, 19-21 Jun. 2001. In a maritime environment, convoy patterns are found for the most part in commercial shipping lanes. However, recent world events can be interpreted to indicate that asymmetric sea threats tend to form groups that move in either a swarm or an intercept pattern. Similarly, airborne objects in general do not travel in convoy formations. The only significant pattern of interest that air objects exhibit can be categorized as a swarm pattern. To date, little research effort has been expanded in identifying these non-convoy types of groups or patterns. It would be convenient to have a general purpose track grouping algorithm that could be applied in all of land, air and maritime domains.

For purposes of analysis, it is assumed that a tracker observing a region provides periodic updates on all "live" tracks in the region. Each track update contains an estimate of the kinematic state (location, current speed, and current direction) of the object being tracked. Thus, at each time instance t, the $k^{th}$ "live" track will be represented by an m-dimensional column vector $T_k^t$. If n "live" tracks exist at a time instance t, their collective kinematic state is represented by an m×n matrix $A^t = [a_{ij}^t]_{m \times n} = [T_1^t \ldots T_n^t]$, in which m and n will in general be greater than unity. The matrix A contains m×n $a_{ij}$ elements. Each column of the matrix A corresponds to a column vector T. A clustering algorithm according to an aspect of the invention organizes "live" tracks into mutually exclusive clusters, $\tilde{G}^t = \{G_1^t, \ldots, G_p^t\}$, at each tracker update interval, and makes the appropriate associations between the members of $\tilde{G}^t$ and $\tilde{G}^{t-1}$ to maximize group continuity.

Figure 3:
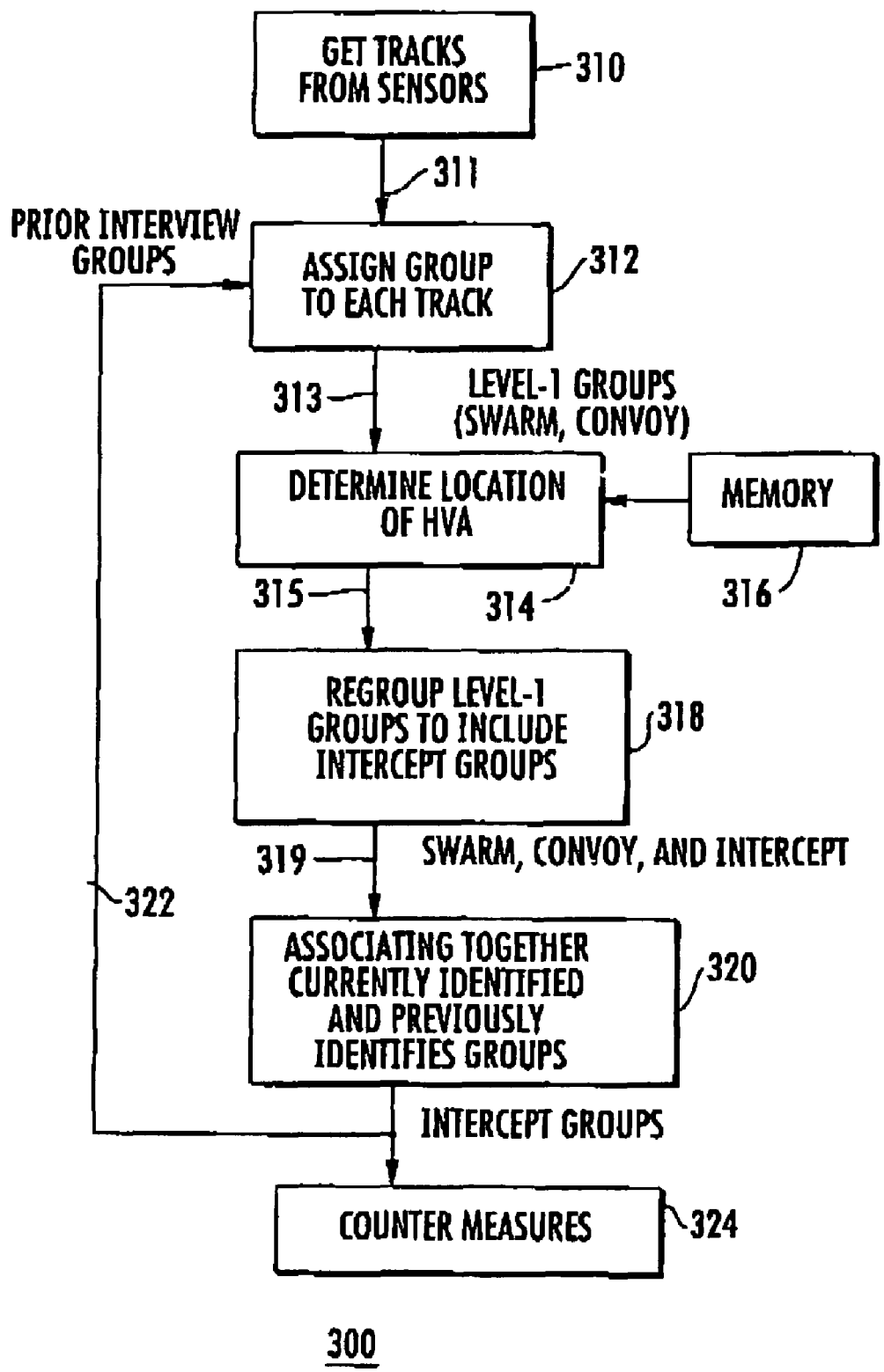
FIG. 3 is a simplified logic flow chart or diagram illustrating the various steps of a method according to an aspect of the invention including a first group assignment step and a second group assignment step.

FIG. 3 is a simplified logic flow chart or diagram illustrating processing 300 according to an aspect of the invention. In general, the grouping algorithm re-formulates or re-groups the track groups in three steps. Each time the tracker generates "live" track updates as suggested by block 310, the tracks are applied by a logic path 311 to a block 312. In the first grouping step represented by block 312, mutually exclusive clusters of tracks are formed representing convoy and swarm group patterns. The information relating to convoy and swarm groups is coupled from block 312 by way of a path 313. In the second step represented by block 314, path 315, and blocks 316 and 318, the identified convoy and swarm groups are re-clustered with the aid of a memory 316 to identify intercept group patterns. The intercept group patterns are made available by way of a logic path 319 to a block 320. In the third and final step represented by block 320 in combination with feedback path 322 and block 312, the appropriate associations between the current clusters and previously identified groups are made so that group continuity is maximized. In the context of a battlespace in which hostile targets are recognized as acting as a group or in concert, the further step of taking countermeasures may be included, as suggested by block 324. Such countermeasures may include attempts to identify and classify (as neutral or hostile) the groups of interest, destroy the hostile targets which are acting in concert, to move high value assets from regions attacked by such hostile targets, and the like.

Figure 4A:
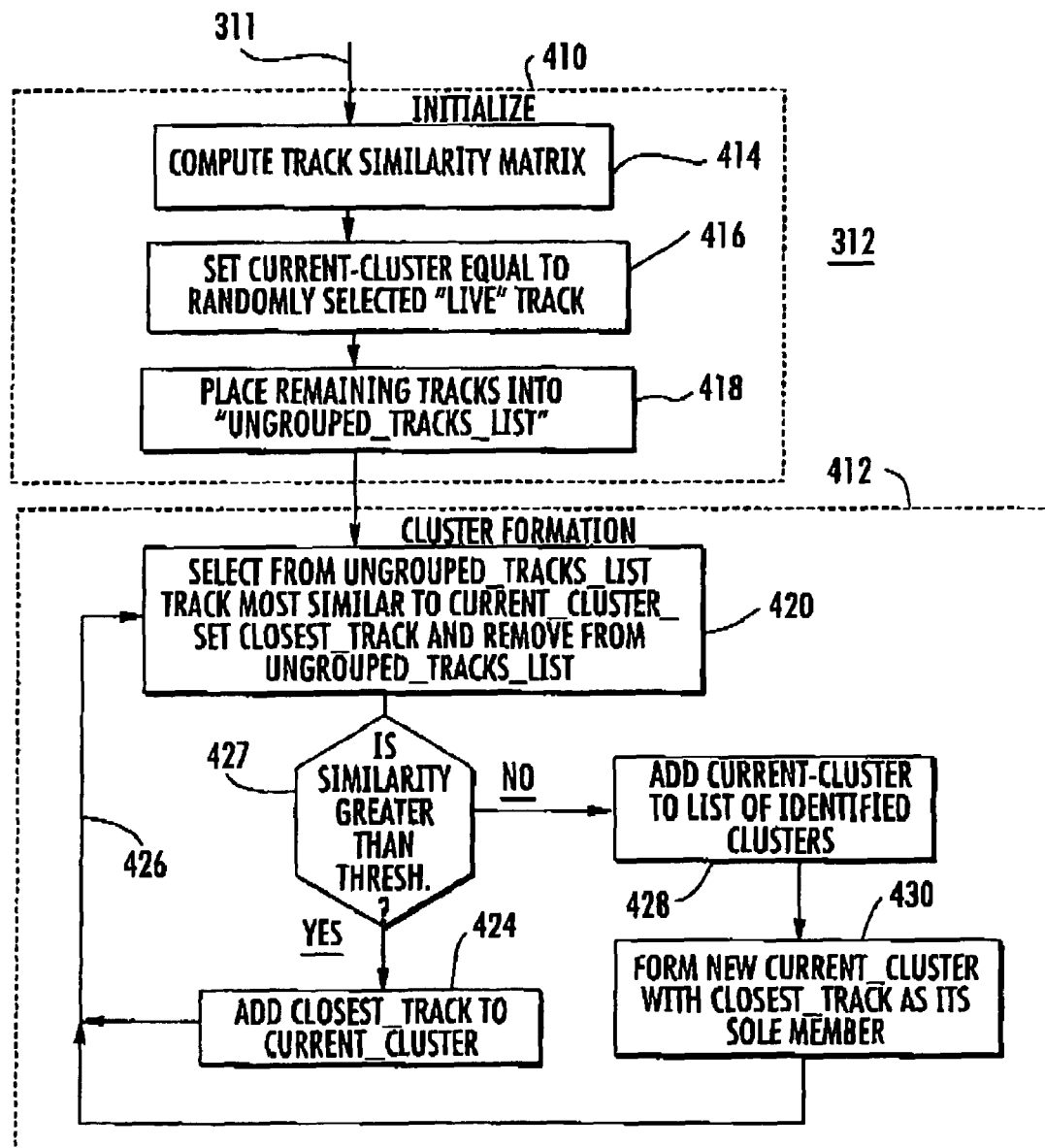
FIG. 4a is a simplified logic flow chart or diagram illustrating the method of the first group assignment step of FIG. 3, and FIG. 4b sets forth the corresponding algorithm.

Because the number of track groups is not known a priori, a K-means-based clustering approach cannot be applied in the first clustering step represented by block 312 of FIG. 3. Instead, an agglomerative hierarchical clustering approach pursuant to that described in A. K. Jain, M. N. Murty, and P. J. Flynn, "Data Clustering: A Review," ACM Computing Surveys, vol. 31, no. 3, pp. 264-323, September 1999 is followed with a threshold condition for defining new groups. A logic flow block diagram or flow chart outlining the first clustering pass appears in FIG. 4a, and includes an initialization step represented by dash-line block 410 and a cluster formation step represented as a dash-line block 412. FIG. 4b represents the corresponding algorithm. The process of FIG. 4a begins by computing the track similarity distance matrix as suggested by block 414 of initialization block 410. Each element of the track similarity distance matrix is designated or termed a "similarity distance coefficient," and is used to characterize how similar two tracks are. Two tracks that appear to be traveling close to each other (as a group) will have a small similarity distance coefficient. Computation of the track similarity distance matrix is performed by, first, comparing the Euclidean distance between all possible track pairs, and comparing the distance with a predetermined threshold. For track pairs in which the Euclidean distance is above the threshold, the track similarity metric is set to infinity. Only for the remaining track pairs is the full track similarity metric computed. In general, only a small subset of track pairs will normally be sufficiently "close" to each other to be considered as part of a group. The process of FIG. 4a continues in block 416 by setting the Current_Cluster equal to a randomly selected "live" track. The remaining tracks are put into an Ungrouped_Tracks_List, block 418. This completes the initialization represented by block 410.

Tracks are sequentially removed from the Ungrouped_Tracks_List and added to the Current_Cluster in a block 420 of FIG. 4a using a greedy policy (a policy that takes the action that appears best in the short run, and ignores long-term effects). At each step of the sequential removal and addition, the (Closest_Track) track most similar to the Current_Cluster is computed or determined. The logic of FIG. 4a flows to a decision block 422. If the similarity distance coefficient between the Closest_Track and the Current_Cluster is above some pre-specified threshold, the logic leaves decision block 422 by the YES output, and arrives at a block 424. Block 424 represents addition of the Closest_Track to the Current_

Cluster. There is still the possibility that other tracks from the Ungrouped_Tracks_List may belong within Current_Cluster, so the logic returns by way of a logic path 426 to block 420, to again select a track from the Ungrouped_Tracks_List and add it to the Current_Cluster if the threshold is met. Eventually, all the tracks that are similar to those in the Current_Cluster will have been added to the cluster, and the next track selected from the Ungrouped_Tracks_List will not be similar to the Current_Cluster, so the logic of FIG. 4a will leave decision block 422 by the NO output, and proceed to a block 428. Block 428 represents the addition of Current_Cluster to the list of identified clusters. From block 428, the logic of FIG. 4a flows to a block 430, which represents formation of a new Current_Cluster with Closest_Track as its only member. From block 430, the logic returns to block 420 for selection of another active track.

The greedy approach described in conjunction with blocks 420, 422, 424, 426, 428, and 430 of FIG. 4a continues until all tracks are placed in a group. The most computationally intensive operation in the first clustering pass represented by logic 312 of FIG. 4a is the search for the track most similar to the Current_Cluster. In one embodiment of the invention, the single-link approach is used, where the similarity distance between a cluster and a track is equal to the shortest distance from the track to any cluster member. As a result, it suffices to compute only once a distance matrix whose elements represent the distances between any two "live" tracks. Then, finding the closest track to a group reduces to a search through the elements on the distance matrix.

The track state space representation directly affects the performance of the clustering algorithm since it is used to quantify (a) how closely located two tracks are, and (b) how similar their movements (directionality and speed) are. These metrics are important in identifying both convoy and swarm groups. For example, neighboring vehicles in a convoy are usually closely located and tend to travel with similar speeds. In swarm formations, while vehicles may not be necessarily close to each other, they tend to travel in the same direction with comparable speeds. The group ID previously assigned to a track is also included in the track state space to capture its clustering history. This attribute is used to introduce a memory component to the track grouping algorithm to promote group continuity. Thus, if two tracks in the previous iteration belonged in the same group, their distance similarity metric should be reduced in the current iteration. Intuitively, if two tracks were in the same group in the previous iteration, we should use this information to bias the algorithm to re-cluster them in the same group. If, however, the tracks are moving in different directions, at some point this bias will not be enough to keep them in the same group and the tracks will be clustered in different groups. If two tracks belonged in different groups their similarity distance metric should increase on subsequent iterations. The states used in a method according to an aspect of the invention are:

$$T_i^t = \begin{bmatrix} t_{i_1}^t \\ t_{i_2}^t \\ t_{i_3}^t \\ t_{i_4}^t \end{bmatrix} = \begin{bmatrix} location^t \\ direction^t \\ speed^t \\ group\ ID_i^{t-1} \end{bmatrix}, \text{ for } i = 1, \ldots, n \quad (1)$$

The track location is represented by the $(x_i^t, y_i^t, z_i^t)$ triplet. A track's direction is represented the latest reported velocity vector $(v_{x_i}^t, v_{y_i}^t, v_{z_i}^t)$. The track's speed is the magnitude of the track's velocity vector. The last track state is the group ID assigned to a track in the previous iteration.

For each pair of "live" tracks i,j at time instance t a similarity distance coefficient $$d_{ij}^t = d^t(T_i^t, T_j^t) \quad (2)$$

is computed. If n "live" tracks are present at time instance t, then the distance matrix is defined as $$D^t = [d_{ij}^t]_{n \times n}. \quad (3)$$

Two commonly used distance coefficients for multidimensional data points (such as track states $T_i^t, T_j^t$) are the normalized Minkowski metric (equation 4) and the Minkowski metric (equation 5):

$$d^t(T_i^t, T_j^t) = \left[ \sum_{k=1}^m w_k (t_{i_k}^t - t_{j_k}^t)^q \right]^{1/q} \quad (4)$$

where $S = [s_{ij}]_{m \times m}$ is any positive definite matrix.

Both of these metrics are difficult to compute and sensitive to the environment. In particular, the selection of the normalization constant $w_k$ in the normalized Minkowski metric, and the S matrix in the Minkowski metric (usually set equal to the sample covariance matrix of the tracks) are non-intuitive and difficult to determine. For this reason a probabilistic derived metric is used according to an aspect of the invention to compute the similarity distance coefficient for two tracks:

$$d^t(T_i^t, T_j^t) = P(T_i^t \text{ and } T_j^t \text{ belong in the same group}) \quad (6)$$

Figure 5:
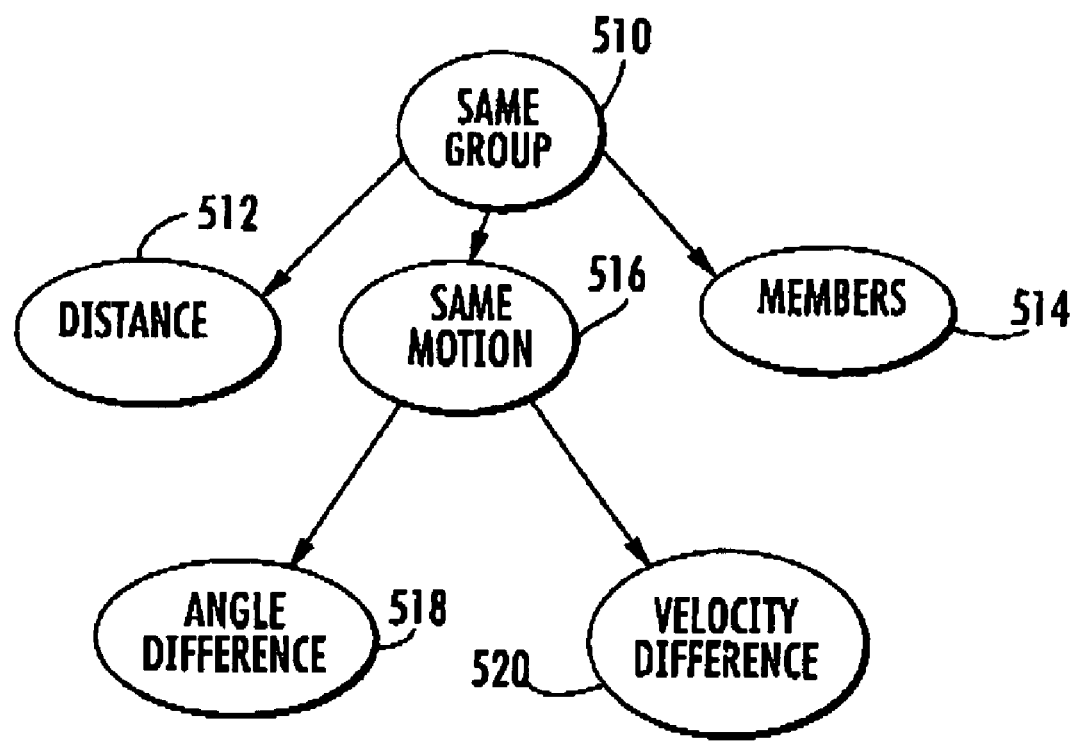
FIG. 5 is a simplified representation of a Bayesian network used to compute the probability that two tracks belong in the same group.

A Bayesian Network (BN) is used to compute this probability that the two tracks belong in the same group. A BN is a graphical model that represents probabilistic relationships among a set of random variables. Each random variable corresponds to a single node in the network. Additionally, edges between variables indicate a direct influence of one random variable value on another. The BN illustrated in FIG. 5 was applied in a computer simulation. The BN group of FIG. 5 includes a Same_Group node or element 510 directly connected or coupled to a Distance node or element 512, a Members node or element 514, and a Motion node or element 516. The Motion node, in turn, is coupled or connected to an Angle Difference node 518 and to a Velocity Difference node 520. The Same_Group node 510 is a binary variable representing two tracks belonging in the same group. The Same_Motion node 516 is a binary variable indicating that tracks are traveling with similar directions and velocities. The remaining nodes represent track state information and are used to derive a probability distribution for the Same_Group node 510. The Distance variable 512 captures the current distance between the two tracks. The Angle Difference (Ang_Diff) and velocity difference (Vel_Diff) variables 518 and 520, respectively, capture the differences between the direction and speed of the two tracks. Finally, the Members binary variable 514 captures the fact that the two tracks previously belonged in the same group (or not).

It should be noted that the result of the first clustering pass represented by block 312 of FIGS. 3 and 4a results, in general, in a plurality of convoy and swarm groups, and many of the swarm groups may contain a single track. A convoy group by definition includes at least two tracks.

The first clustering pass represented by block 312 of FIGS. 3 and 4a generates a set of convoy andor swarm groups. The second clustering pass, represented by block 318 of FIG. 3, re-clusters the convoy and swarm groups to form or identify intercept groups. There are at least two ways to define intercept groups. In the first definition, groups projected to converge at any point and time in the battlefield are considered to be intercept groups. In the second definition, groups projected to converge only at particular points of interest in the battlefield are considered to be intercept groups. During initial system development, the first definition was adopted and an approach was developed. However, experimentation showed that in high traffic areas, where vehicles perform a variety of maneuvers, a large number of intercept groups tended to be produced, which rarely corresponded to coordinated groups. For this reason, the second definition of intercept group was adopted, while recognizing that in a low-traffic environment, the first definition may be used. In the following description, two groups will be clustered and deemed to be an intercept group if they are projected to concurrently converge at a High Value Asset (HVA). HVAs can be either stationary or moving. Thus, part of the method for determining intercept group status lies in determining the location(s) of friendly high value assets. Determination of location of HVAs is performed in block 314 of the logic of FIG. 3. The determination may be made by direct sensing of the location of the HVA, or by recourse to information stored in a memory illustrated as a block 316.

Figure 6:
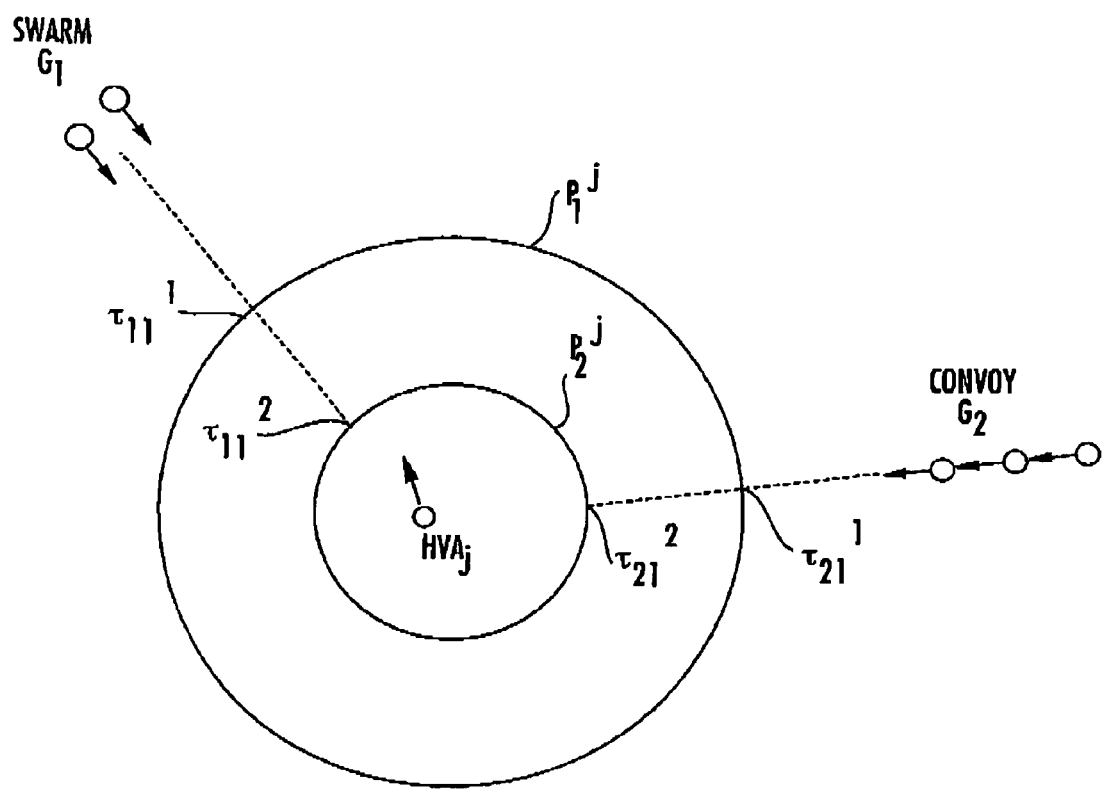
FIG. 6 is a simplified representation of an environment surrounding a high-value asset, showing track projections aiding in determining intercept groups or clusters.

FIG. 6 illustrates two defense perimeters defined around a representative high-value asset ($HVA_j$). The two defense perimeters are represented in FIG. 6 by two concentric spheres, appearing as concentric circles because of the limitations of the illustration. The larger sphere $P_1^j$ represents the outer defense perimeter for HVA j, while $P_2^j$ represents the inner defense perimeter.

For each convoy andor swarm group generated by the first clustering pass, designated as $g_i$ in FIG. 6, a projected intercept time $\tau_{ij}^k$ is computed. Intercept time $\tau_{ij}^k$ denotes the time at which the group intersects the $k^{th}$ perimeter of HVA j at the current speed. This intercept time can be analytically computed as follows:

$$\tau_{ij}^k = \frac{-B \pm \sqrt{B^2 - 4A(C - R_k^2)}}{2A}, \quad \tau_{ij}^k \text{ real and greater than zero} \quad (7)$$

where:
$R_k$=Radius of $P_j^k$
$A=(v_x^{g_i}-v_x^{HVA_{ji}})^2+(v_y^{g_i}-v_y^{HVA_{ji}})^2+(v_z^{g_i}-v_z^{HVA_{ji}})^2$
$B=2((v_x^{g_i}-v_x^{HVA_{ji}})(x^{g_i}-x^{HVA_{ji}})+(v_y^{g_i}-v_y^{HVA_{ji}})(y^{g_i}-y^{HVA_{ji}})+(v_z^{g_i}-v_z^{HVA_{ji}})(z^{g_i}-z^{HVA_{ji}}))$
$C=(x^{g_i}-x^{HVA_{ji}})^2+(y^{g_i}-y^{HVA_{ji}})^2+(z^{g_i}-z^{HVA_{ji}})^2$ The intercept time is set to infinity if a group is not projected to intercept perimeter k, and zero if it is already within perimeter k.

Figure 7A:
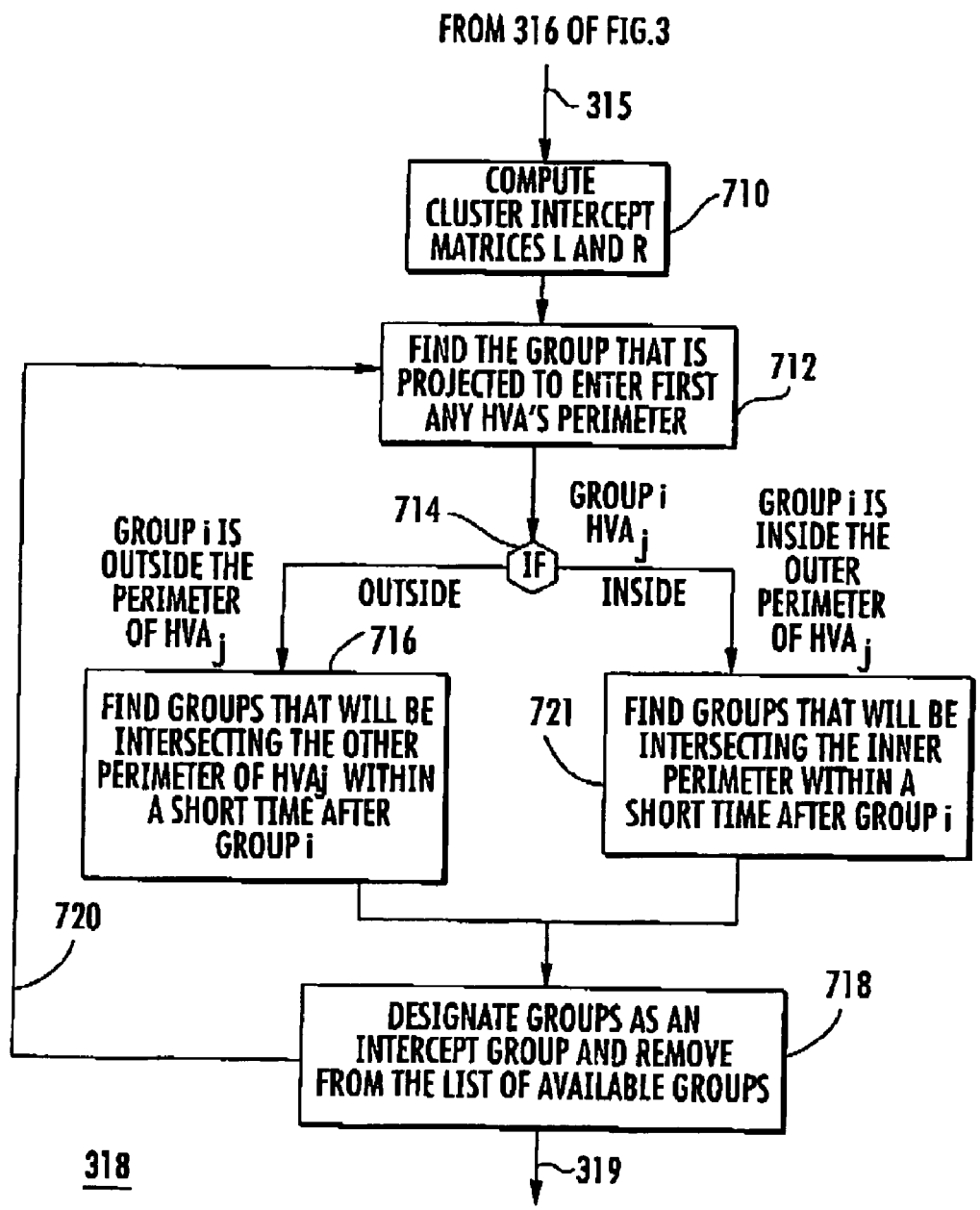
FIG. 7a is a simplified logic flow chart or diagram illustrating the method of the second group assignment step of FIG. 3, and FIG. 7b sets forth the corresponding algorithm.

Following the assignment of tracks to convoy andor swarm groups in block 312 of the overall logic of FIG. 3, and also following the determination of the locations of HVAs in block 314, the logic flows to block 318, which represents identification of those convoy or swarm groups or clusters which intercept a HVA. Intercept track groups are then identified using a depth-first search as described by in Judea Pearl, "Heuristics: Intelligent Search Strategies For Computer Problem Solving". Addison-Wesley, 1984, pp 36-42. The depth-first search attempts to construct sequences of clusters that all converge at the HVA in the battlefield. FIG. 7a is a simplified logic flow chart or diagram illustrating details of the logic flow associated with the second clustering operation, and FIG. 7b represents one possible form which the algorithm can take. The logic of FIG. 7a includes an initialization step and a grouping step. The initialization step of the second clustering is represented in FIG. 7a by block 710. In block 710, two cluster intercept matrices $I^1$ and $I^2$ are formed, indicating the times at which each swarm or convoy group is projected to intercept the two defense perimeters of each HVA. If the first clustering pass generates p clusters, and there are m HVAs, then the cluster intercept matrices are defined as $$I^k=[\tau_{ij}^k]_{p \times m}, k=1,2 \quad (8)$$

From block 710 of FIG. 7a, the logic flows to a block 712, which represents the determination of the identity of that group (group i) which is projected to be the first in time to enter the first or outermost perimeter of any HVA ($HVA_j$). The logic flows from block 712 to a decision block 714, which determines if group i is currently inside or outside of the outer perimeter of $HVA_j$. If group i is currently outside of the outermost perimeter of $HVA_j$, the logic flows to a block 716. Block 716 represents the identification of groups that are projected to intersect with the outer perimeter of $HVA_j$ within a threshold time after group i. Once these groups are determined, the logic leaves block 716 and proceeds to a block 718. Block 718 represents the declaration of the groups identified by block 716 as intercept groups, and removal of the intercept groups so declared from the list of available groups. The logic then returns to block 712 by way of a logic path 720, for identification of the next group, so far not declared to be an intercept group, which is projected to be the next in time to enter the outer perimeter of any HVA. In that case in which decision block 714 identifies group i as being inside (rather than outside) the outer perimeter of the currently processed HVA, the logic flows from decision block 714 to a block 722. Block 722 represents the identification of groups which are projected to reach the inner perimeter of the HVA within a given threshold time after group j reaches the inner perimeter. From block 722, the logic of FIG. 7a proceeds to block 718, already described, and returns to begin another iteration through the logic of FIG. 7a.

It may be intuitively understood that the algorithm represented by FIG. 7a iteratively selects the convoy or swarm cluster that is projected to first enter the outer and inner defense perimeters of a HVA, and attempts to find any other groups that are also projected to enter this perimeter at approximately the same time. There are a few cases that require special attention. First, when the selected convoy or swarm cluster is currently within the outer defense perimeter of a HVA, but outside the inner perimeter. In this first case, the algorithm finds all groups that are projected to intersect the inner defense perimeter at approximately the same time. The second case requiring special attention occurs when the selected group is within the inner defense perimeter. In this second special case, the group is clustered with all other groups that will be entering the inner perimeter within a short period of time. These periods of time for inner and outer perimeters may be the same, or they may be different. The threshold times may be adjusted depending upon the dimensions of the inner and outer perimeters.

When the second clustering step described in conjunction with FIG. 7a is completed, the current iteration through the logic of blocks 310, 312, 314, and 318 of FIG. 3 has identified convoy and swarm clusters or groups, and has identified those convoy and swarm clusters which define intercept groups. Block 320 of FIG. 3 represents the associating together of those groups so far identified with groups identified during previous iterations. Block 320 determines if a Level 2 group from the current iteration is the same Level 2 group identified in the previous iteration. Thus, block 320 indicates if kth Level 2 group identified in the current iteration is the same as the nth Level 2 group identified in the previous pass, and if the answer is yes, assigns to these groups the same group identification (ID). The group identification is a tag by which the group is identified or referenced. Thus, the output of the second clustering pass is Level 2 Groups. A level 2 group may simply be a swarm or a convoy group, or an intercept group. An intercept group is nothing more than a grouping of one or more swarm/convoy groups.

Figure 8:
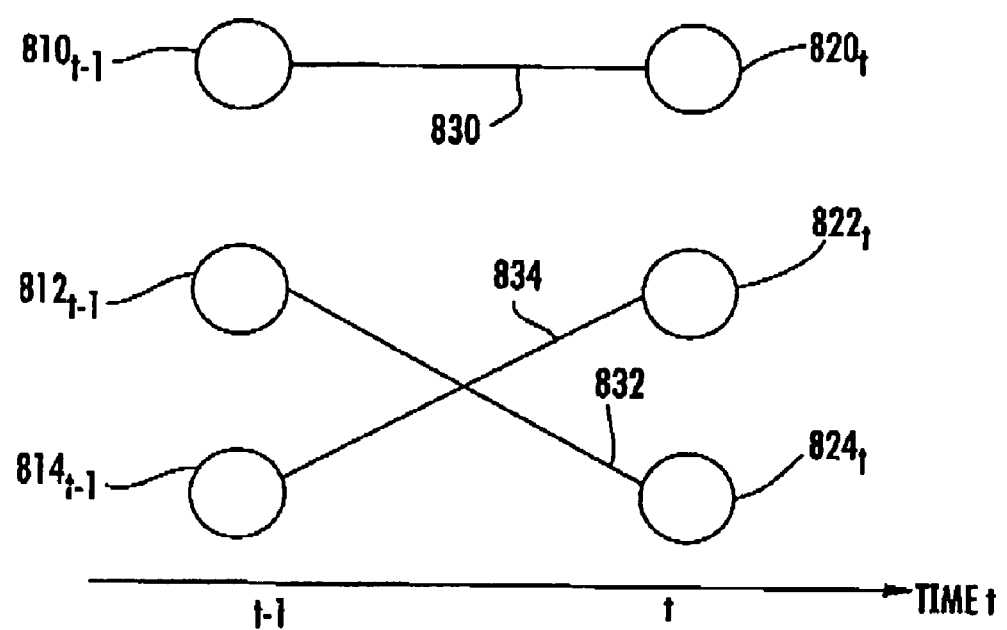
FIG. 8 is a simplified time line representation of the association of time-adjacent track groups.

The third step in processing according to an aspect of the invention addresses the problem of associating groups generated in successive time intervals. FIG. 8 is a simplified time line representation of the association of time-adjacent track groups. In FIG. 8, three groups exist at time t−1, namely groups $810_{t-1}$, $812_{t-1}$, and $814_{t-1}$. At time t the groups are $820_t$, $822_t$, and $824_t$. The associations between or among the groups at their disparate times are illustrated by connecting lines. Thus, a line 830 connects groups $810_{t-1}$ and $820_t$, a line 832 connects groups $812_{t-1}$ and $824_t$, and a line 834 connects groups $814_{t-1}$ and $822_t$. In particular, the problem of making the appropriate assignments between the elements of $\tilde{G}^t = \{G_1^t, \ldots, G_p^t\}$ and $\tilde{G}^{t-1} = \{G_1^{t-1}, \ldots, G_q^{t-1}\}$ is addressed. A straight-forward approach to associating groups in successive time intervals would be to identify groups in time t that contain exactly the same track components as in time t−1. The main problem with such an approach is that when tracks merge or break out of a predefined group, the algorithm would form a new group. In high traffic environments this approach would invalidate a large number of groups and produce an equally high number of new groups at each new time instance. Thus, this approach does not appear to be useful in the current context. It would be desirable to identify track groups that remain approximately constant across adjacent time intervals.

The group association problem of block 320 of FIG. 3 is cast as an optimal assignment problem. In a classical asymmetric assignment problem, m persons are matched with m out of n objects (m<n), as indicated by in Dimitri P. Bertsekas and David A. Castanon, "A forward/reverse auction algorithm for asymmetric assignment problems", January 1993, LIDS-P-2159. The benefit for matching a person with an object is given, and the objective is to assign all the persons to distinct objects so as to maximize the total benefit. The benefit of assigning person i to object j is denoted by $b_{ij}$. For m persons and n objects an assignment matrix $$B = [b_{ij}]_{m \times n} \quad (9)$$

is formed. It should be noted that since each person can be matched with exactly one object, the asymmetric assignment problem is a constraint optimization problem which in general is an NP-hard problem. The optimal solution to the asymmetric assignment problem of making the associations is obtained by the forward-reverse auction algorithm, as described by in Dimitri P. Bertsekas and David A. Castanon, "A forward/reverse auction algorithm for asymmetric assignment problems", January 1993, LIDS-P-2159. Thus, the forward/reverse auction algorithm is used in block 320 of FIG. 3 to associate together groups previously identified.

Without loss of generality, it is assumed that at time t the clustering algorithm has produced more groups than it had for time instance t−1. Under this assumption, for the asymmetric assignment problem the persons correspond to the groups at time t−1 and the objects correspond to the groups identified at time t. To optimally solve the group association problem, it remains to define an assignment matrix and apply the forward-reverse auction algorithm. In our application, the benefit of associating two groups in successive time intervals is defined as the number of common elements between two groups, i.e. $b_{ij} = |G_i^{t-1} \cap G_j^t|$. The forward-reverse auction algorithm generates assignments such that the total benefit of assigning all groups at time t−1 to the groups at time t is maximized. As a result, the algorithm may return assignments where the corresponding benefit associating two groups is equal to zero (no common tracks). All such assignments are rejected and these groups are declared as new.

From block 320 of FIG. 3, the logic returns by way of a path 322 to block 312 to begin another iteration with a new set of tracks. The intercept groups identified in block 320 of FIG. 3 can also be subject to countermeasures, as suggested by block 324.

Figure 9:
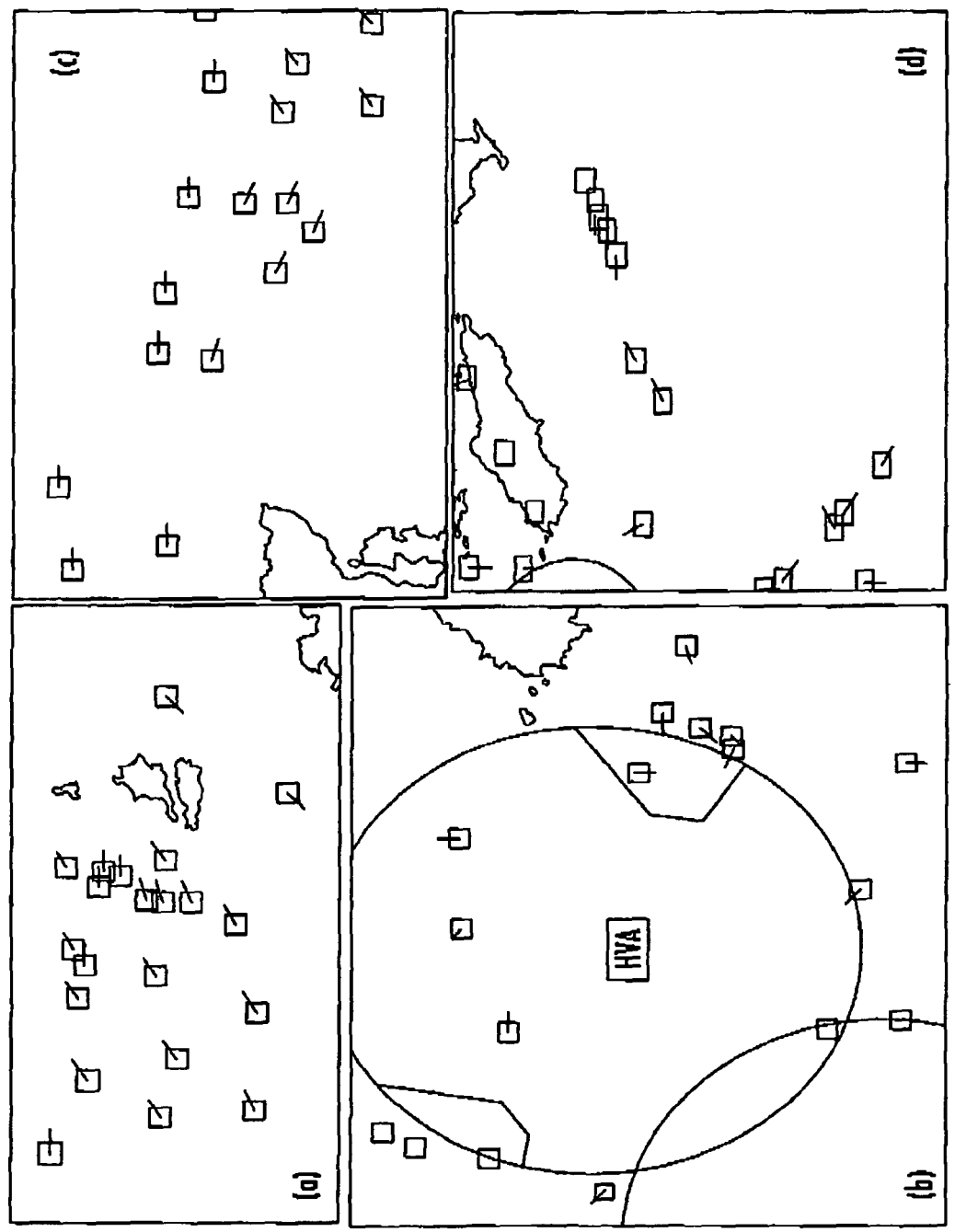
FIGS. 9a, 9b, 9c, and 9d are simplified displays of representations of tracks relating to the locations of targets in portions of a simulated battlespace, illustrating a group of tracks breaking out from a group of stationary tracks, a group of tracks converging upon a high value asset (HVA), a swarm in a high traffic area, and a convoy, respectively.

A series of scenarios were carefully scripted in a high fidelity simulation to test the algorithm's ability to identify and maintain groups of coordinating objects. Each scenario contained 3 HVA tracks, 84 background traffic tracks and 5 to 12 tracks (depending on the scenario) corresponding to coordinating objects. The scenarios were designed to test the clustering algorithm ability to detect swarming, convoy, and intercept groups performing a variety of deception tactics. The results of four different scenarios are presented in FIGS. 9a, 9b, 9c, and 9d. The boxes in these figures represent tracks and the lines starting from the centers of the boxes represent their velocities. In all four scenarios the grouping algorithm performed well, as it correctly grouped the scripted cooperating tracks. Specifically, in FIG. 9a a group is identified as breaking out from a group of stationary tracks. In FIG. 9b a group of tracks converging upon a HVA is identified. In FIG. 9c a swarm is identified in a high traffic area and in FIG. 9d a convoy group is identified.

Other embodiments of the invention will be apparent to those skilled in the art. For example, the exact ordering of steps of the various methods and modes may be varied so long as the essential described functions are maintained. More particularly, the computation of the track similarity matrix may be performed all at once, as described in conjunction with FIG. 4a, or the computations may be performed on an as-needed basis. Similarly, the various steps described in conjunction with blocks 416, 418 and 420 may be performed in different orders. If desired, more than two perimeters about high-value assets may be defined.

A method (300) according to an aspect of the invention is for establishing the existence of coordination among targets tracked by at least one sensor system (12, 14). The method (300) comprises the step of generating tracks (310) representing an estimate of the location, current speed, and current direction of targets within a region of interest. The speed and direction may be derived from sensor information relating to the position of the targets from time to time. The method (300) includes the step of iteratively performing a number of steps, including the step of (a) assigning to each of a plurality of tracks a pattern characteristic of one of convoy group and swarm group, which is to say either convoy group or swarm group (312). The second step of the iteration is (b) determining the estimated location of one or more defined assets (314), which step (b) may include sub-steps of determining the estimated location of a high-value asset and determining the location of at least one perimeter ($P_1^j$) about the location. The third step (c) of the iteration is the determination (318) if the projection of the current movement of two or more of the convoy groups or swarm groups "simultaneously" intersect at the estimated location of any one of the defined assets, to thereby define an intercept group. The term "simultaneously" depends upon the context, but implies some identified time interval which is consistent with identification of intercepting elements in the applicable context. The iterative process also includes the step (d) of associating together groups identified during the current iteration with corresponding groups identified during prior iterations (320), to promote group continuity as a function of time. The associating step may include the use of a forward/reverse auction algorithm, known in the art. The step of assigning to each track a pattern characteristic of one of convoy group and swarm group may include the step of favoring prior-established groupings. In a battlespace or military context, an additional step may include taking of action (324) against at least elements of the identified target groups acting together.

In a preferred mode of the method (300), the step (312) of assigning to each of a plurality of tracks a pattern characteristic of one of convoy group and swarm group includes the steps of (a) computing track similarity matrices (414) for all pairs of tracks, and (b) selecting a base track from a list of tracks (416), which base track may be randomly selected. This mode further includes the step (420) of selecting from among the list of tracks that remaining track which is most similar to the base track, and removing the remaining track from the list of all tracks, and repeating the steps of selecting a first track and selecting from among the list of tracks, until the list of tracks is empty.

According to an aspect of the invention, the step (312) of assigning to each of a plurality of tracks a pattern characteristic of one of convoy group and swarm group may include the steps of (a) placing all tracks into a list of ungrouped tracks and (b) computing track similarity matrices (414) for all pairs of tracks in the list of ungrouped tracks. In this aspect, a base track is selected (420) from the list of ungrouped tracks, and deemed to be a member of a first group or cluster. The base track is removed from the list of ungrouped tracks. From the list of ungrouped tracks, that track which is most similar to the base track is selected, to thereby identify a most similar track. The most similar track is removed from the list of ungrouped tracks. The similarity between the base track and the most similar track is compared (422) with a threshold, to thereby identify that threshold-exceeding most similar track as being one in which the similarity exceeds a threshold and that non-threshold-exceeding most similar track as being one in which the similarity does not exceed the threshold. The threshold-exceeding most similar track is added to the first group or cluster (424) and the non-threshold-exceeding most similar track is identified as a new group (430).

In an advantageous mode of the method (300), the step (318) of determining if the projection of the current movement of two or more of the convoy groups or swarm groups simultaneously intersect at the estimated location of any one of the defined assets may comprise the step (712) of identifying that one of the convoy group and swarm group projected to first enter a perimeter ($P_1^j$) about one of the assets ($HVA_j$), and determining (714) if the one of the convoy group and swarm group projected to first enter a perimeter ($P_1^j$) is within or without the perimeter. If the first group is without the perimeter, an identification is made (716) of those of the convoy groups and swarm groups which are projected to enter the perimeter within a threshold time of the one of the convoy group and swarm group projected to first enter a perimeter. Such convoy groups and swarm groups are deemed to be intercepting groups. If the first group is within the perimeter, an identification is made (722) of those of the convoy groups and swarm groups which are projected to enter a second perimeter ($P_2^j$), smaller than the first perimeter ($P_1^j$), about the asset ($HVA_j$) within a second threshold time, and deeming such convoy groups and swarm groups to be intercepting groups. The second threshold time may be the same as the first threshold time.

What is claimed is:

1. A method for establishing coordination among targets tracked by at least one sensor system, said method comprising the steps of:

generating tracks in a computer process, the tracks representing an estimate of location, current speed, and current direction of targets within a region of interest;

iteratively in a computer process:
assigning to each of a plurality of tracks a pattern characteristic of one of a convoy group and a swarm group;
determining an estimated location of one or more defined assets;
determining if a projection of a current movement of two or more of said convoy groups or swarm groups simultaneously intersect at said estimated location of any one of said defined assets, to define an intercept group; and
associating groups identified during a current iteration with corresponding groups identified during a prior iteration, to identify target groups acting together.

2. A method according to claim 1, wherein said step of assigning to each track a pattern characteristic of one of convoy group and swarm group includes the step of favoring prior-established groupings.

3. A method according to claim 2, wherein said step of determining the estimated location of one or more defined assets includes the steps of:
determining an estimated location of a high-value asset; and
determining a location of two concentric perimeters about said estimated location.

4. A method according to claim 1, further comprising the step of taking action against at least elements of said identified target groups acting together.

5. A method according to claim 1, wherein said step of assigning to each of a plurality of tracks a pattern characteristic of one of a convoy group and a swarm group includes the steps of:
computing track similarity matrices for pairs of tracks;
selecting a base track from a list of tracks;
selecting from among the list of tracks a remaining track which is most similar to said base track, and removing said remaining track from said list of tracks; and
repeating said steps of: selecting a base track, and selecting from among the list of tracks, until said list of tracks is empty.

6. A method according to claim 1, wherein said step of assigning to each of a plurality of tracks a pattern characteristic of one of a convoy group and a swarm group includes the steps of:
placing all of said plurality of tracks in a list of ungrouped tracks;
computing track similarity matrices for pairs of tracks in said list of ungrouped tracks;
selecting a base track from said list of ungrouped tracks, deeming it to be a member of a first group, and removing said base track from said list of ungrouped tracks;
selecting from among the list of ungrouped tracks a track which is most similar to said base track to thereby identify a most similar track, removing said most similar track from said list of ungrouped tracks, and comparing with a threshold the similarity between said base track and said most similar track, to thereby identify that threshold-exceeding most similar track as being one in which the similarity exceeds the threshold and that non-threshold-exceeding most similar track as being one in which said similarity does not exceed said threshold; and
adding said threshold-exceeding most similar track to said first group and identifying said non-threshold-exceeding most similar track as a new group.

7. A method according to claim 1, wherein said step of determining the estimated location of one or more defined assets includes the steps of:
  determining an estimated location of a high-value asset;
  determining a location of at least one perimeter about said estimated location.

8. A method according to claim 1, wherein said step of determining if the projection of the current movement of two or more of said convoy groups or swarm groups simultaneously intersect at said estimated location of any one of said defined assets comprises the steps of:
  identifying that one of said convoy group and swarm group projected to first enter a perimeter about one of said assets;
  determining if said one of said convoy group and swarm group projected to first enter a perimeter is within or without said perimeter;
  if said first group is without said perimeter, identifying those of said convoy groups and swarm groups which are projected to enter said perimeter within a threshold time of said one of said convoy group and swarm group projected to first enter a perimeter, and deeming such convoy groups and swarm groups to be intercepting groups; or
  if said first group is within said perimeter, identifying those of said convoy groups and swarm groups which are projected to enter a second perimeter, said second perimeter being smaller than said first perimeter, about said asset within a second threshold time, and deeming such convoy groups and swarm groups to be intercepting groups.

9. A method according to claim 1, wherein said step of associating together groups identified during the current iteration with corresponding groups identified during prior iterations, to thereby identify target groups acting together comprises the step of:
  using a forward/reverse auction algorithm.

10. A system for establishing coordination among targets tracked by at least one sensor system, said system comprising:
  a processor executing instructions for:
    generating tracks representing an estimate of location, current speed, and current direction of targets within a region of interest;
    iteratively:
      assigning to each of a plurality of tracks a pattern characteristic of one of a convoy group and a swarm group;
      determining an estimated location of one or more defined assets;
      determining if a projection of a current movement of two or more of said convoy groups or swarm groups simultaneously intersect at said estimated location of any one of said defined assets, to define an intercept group; and
      associating groups identified during a current iteration with corresponding groups identified during a prior iteration, to identify target groups acting together.

11. A system according to claim 10, wherein said step of assigning to each track a pattern characteristic of one of convoy group and swarm group includes the step of favoring prior-established groupings.

12. A system according to claim 11, wherein said step of determining the estimated location of one or more defined assets includes the steps of:
  determining an estimated location of a high-value asset; and
  determining a location of two concentric perimeters about said estimated location.

13. A system according to claim 10, wherein the processor is configured to execute the further step of taking action against at least elements of said identified target groups acting together.

14. A system according to claim 10, wherein said step of assigning to each of a plurality of tracks a pattern characteristic of one of a convoy group and a swarm group includes the steps of:
  computing track similarity matrices for pairs of tracks;
  selecting a base track from a list of tracks;
  selecting from among the list of tracks a remaining track which is most similar to said base track, and removing said remaining track from said list of tracks; and
  repeating said steps of: selecting a base track, and selecting from among the list of tracks, until said list of tracks is empty.

15. A system according to claim 10, wherein said step of assigning to each of a plurality of tracks a pattern characteristic of one of convoy group and swarm group includes the steps of:
  placing all of said plurality of tracks in a list of ungrouped tracks;
  computing track similarity matrices for pairs of tracks in said list of ungrouped tracks;
  selecting a base track from said list of ungrouped tracks, deeming it to be a member of a first group, and removing said base track from said list of ungrouped tracks;
  selecting from among the list of ungrouped tracks a track which is most similar to said base track to thereby identify a most similar track, removing said most similar track from said list of ungrouped tracks, and comparing with a threshold the similarity between said base track and said most similar track, to thereby identify that threshold-exceeding most similar track as being one in which the similarity exceeds the threshold and that non-threshold-exceeding most similar track as being one in which said similarity does not exceed said threshold; and
  adding said threshold-exceeding most similar track to said first group and identifying said non-threshold-exceeding most similar track as a new group.

16. A system according to claim 10, wherein said step of determining the estimated location of one or more defined assets includes the steps of:
  determining an estimated location of a high-value asset;
  determining a location of at least one perimeter about said estimated location.

17. A system according to claim 10, wherein said step of determining if the projection of the current movement of two or more of said convoy groups or swarm groups simultaneously intersect at said estimated location of any one of said defined assets comprises the steps of:
  identifying that one of said convoy group and swarm group projected to first enter a perimeter about one of said assets;
  determining if said one of said convoy group and swarm group projected to first enter a perimeter is within or without said perimeter;
  if said first group is without said perimeter, identifying those of said convoy groups and swarm groups which are projected to enter said perimeter within a threshold time of said one of said convoy group and swarm group projected to first enter a perimeter, and deeming such convoy groups and swarm groups to be intercepting groups;

if said first group is within said perimeter, identifying those of said convoy groups and swarm groups which are projected to enter a second perimeter, said second perimeter being smaller than said first perimeter, about said asset within a second threshold time, and deeming such convoy groups and swarm groups to be intercepting groups.

18. A system according to claim 10, wherein said step of associating together groups identified during the current iteration with corresponding groups identified during prior iterations, to thereby identify target groups acting together comprises the step of:

using a forward/reverse auction algorithm.

* * * * *